(12) United States Patent
Kwon et al.

(10) Patent No.: US 10,325,548 B2
(45) Date of Patent: Jun. 18, 2019

(54) POWER CONVERTER, DISPLAY DEVICE INCLUDING POWER CONVERTER, AND METHOD OF OPERATING POWER CONVERTER

(71) Applicant: Samsung Display Co., Ltd., Yongin-si, Gyeonggi-Do (KR)

(72) Inventors: Soon-Gi Kwon, Cheonan-si (KR); Sung-Chun Park, Suwon-si (KR)

(73) Assignee: Samsung Display Co., Ltd. (KR)

( * ) Notice: Subject to any disclaimer, the term of this patent is extended or adjusted under 35 U.S.C. 154(b) by 67 days.

(21) Appl. No.: 15/427,584

(22) Filed: Feb. 8, 2017

(65) Prior Publication Data

US 2017/0243530 A1 Aug. 24, 2017

(30) Foreign Application Priority Data

Feb. 23, 2016 (KR) .......................... 10-2016-0020942

(51) Int. Cl.
| | |
|---|---|
| G09G 3/20 | (2006.01) |
| H02M 1/15 | (2006.01) |
| H02M 3/158 | (2006.01) |
| H02M 1/00 | (2006.01) |

(52) U.S. Cl.
CPC ............ *G09G 3/2092* (2013.01); *H02M 1/15* (2013.01); *H02M 3/158* (2013.01); *G09G 2300/043* (2013.01); *G09G 2310/08* (2013.01); *G09G 2330/00* (2013.01); *H02M 2001/0022* (2013.01)

(58) Field of Classification Search
CPC ............ G09G 3/2092; G09G 2300/00; G09G 2300/043; G09G 2310/08; H02M 1/15; H02M 3/158; H02M 2001/0022
See application file for complete search history.

(56) References Cited

U.S. PATENT DOCUMENTS

| | | | | |
|---|---|---|---|---|
| 2008/0239774 A1* | 10/2008 | Canfield | ............. | H02M 3/1588 363/127 |
| 2009/0302814 A1* | 12/2009 | Kapels | ................ | H02M 3/1588 323/282 |
| 2012/0229111 A1* | 9/2012 | Serdarevic | .......... | H02M 3/1582 323/282 |

(Continued)

FOREIGN PATENT DOCUMENTS

| | | |
|---|---|---|
| KR | 10-0833764 B1 | 5/2008 |
| KR | 10-2013-0053498 A | 5/2013 |

*Primary Examiner* — David Tung
(74) *Attorney, Agent, or Firm* — Innovation Counsel LLP (57) ABSTRACT

A power converter may include the following elements: an input terminal for receiving an input voltage; an output terminal for providing an output voltage; a reference member for receiving a reference voltage; a first transistor electrically connected between the reference member and the input terminal; a second transistor electrically connected between the input terminal and the output terminal; a diode electrically connected in parallel with the second transistor; and a controller for selecting a first mode if the input voltage is greater than a first reference voltage level and for selecting a second mode if the input voltage has been less than a second reference voltage level for a reference time period. The first transistor and the diode may generate the output voltage in the first mode. The first transistor and the second transistor may generate the output voltage in the second mode.

18 Claims, 8 Drawing Sheets

(56) References Cited

U.S. PATENT DOCUMENTS

2013/0241503 A1\* 9/2013 Galinski, III ....... H02M 3/1582
 323/271
2017/0012526 A1\* 1/2017 Chen ....................... H02M 1/38

\* cited by examiner

| VTH(THRESHOLD LEVEL) | VALUE[mA] |
|---|---|
| VTH1 | 100 |
| VTH2 | 200 |
| VTH3 | 300 |
| VTH4 | 400 |

~610

| TDEB(DEBOUNCE TIME) | VALUE[msec] |
|---|---|
| TDEB1 | 1 |
| TDEB2 | 5 |
| TDEB3 | 10 |
| TDEB4 | 16 |

~620

| TA_ENT | VALUE[LOGIC LEVEL] |
|---|---|
| TA_ENT1 | HIGH(ASYNCHRONOUS MODE) |
| TA_ENT2 | LOW(SYNCHRONOUS MODE) |

POWER CONVERTER, DISPLAY DEVICE INCLUDING POWER CONVERTER, AND METHOD OF OPERATING POWER CONVERTER

CROSS-REFERENCE TO RELATED APPLICATION(S)

This application claims priority under 35 USC § 119 to Korean Patent Application No. 10-2016-0020942, filed on Feb. 23, 2016 in the Korean Intellectual Property Office (KIPO); the contents of the Korean Patent Application are incorporated herein by reference.

BACKGROUND

1. Technical Field

The technical field is related to a power converter, a display device including the power converter, and a method of operating the power converter.

2. Description of the Related Art

A power converter, e.g., a boost converter, may output an output voltage by increasing (or by boosting) an input voltage. A display device may include a power converter for providing an output voltage to a display panel of the display device.

When noise exists in an input voltage, an output voltage provided by a power converter may overshoot or undershoot. As a result, an undesirable flicker may occur in an image displayed by the display device that includes the power converter.

SUMMARY

Some example embodiments are related to a power converter, e.g., a boost converter, structured to output a stable voltage (or a constant voltage) even if noise exists in an input voltage.

Some example embodiments are related to a display device including the power converter.

Some example embodiments are related to a method of operating the power converter.

According to example embodiments, a boost converter may include the following elements: a first transistor electrically connected between a reference voltage level and an input terminal which receives an input voltage; a second transistor electrically connected between the input terminal and an output terminal; a diode electrically connected parallel to the second transistor; and a controller configured to select a first mode when the input voltage is greater than a first reference voltage level and to select a second mode when the input voltage is less than a second reference voltage level for a reference time. In embodiments, the boost converter may generate an output voltage using the first transistor and the second transistor in the first mode and may generate the output voltage using the first transistor and the diode in the second mode.

In example embodiments, the controller may control the first transistor and the second transistor to be alternately turned on in the second mode.

In example embodiments, the controller may control the second transistor to be turned off in the first mode.

In example embodiments, the controller may include a comparator configured to compare the input voltage and one of the first reference voltage level and the second reference voltage level; and a mode determiner configured to select one of the first mode and the second mode based on a comparison result of the comparator and the reference time.

In example embodiments, the controller may further include a control signal generator configured to generate a first control signal for the first transistor and a second control signal for the second transistor based on a selected one of the first mode and the second mode.

In example embodiments, the controller may further include a determiner configured to set the first reference voltage level, the second reference voltage level, and the reference time.

In example embodiments, the controller may set the second reference voltage level based one the first reference voltage level and one selected among input threshold voltages.

In example embodiments, the second reference voltage level may be lower than the first reference voltage level by a selected one among the input threshold levels.

In example embodiments, the determiner may select a first reference time among reference times.

In example embodiments, the controller may receive a mode selection signal from an external component and may select one of the first mode and the second mode based on the mode selection signal.

According to example embodiments, a display device may include a display panel and a boost converter. The boost converter may generate an output voltage using an input voltage and may provide the output voltage to the display panel. The boost converter may include the following elements: a first transistor electrically connected between a reference voltage level and an input terminal which receives the input voltage; a second transistor electrically connected between the input terminal and an output terminal; a diode electrically connected parallel to the second transistor; and a controller configured to select a first mode when the input voltage is greater than a first reference voltage level and to select a second mode when the input voltage is less than a second reference voltage level for a reference time. Here, the boost converter may generate the output voltage using the first transistor and the second transistor in the first mode and may generate the output voltage using the first transistor and the diode in the second mode.

In example embodiments, the display device may further include a power controller configured to convert an external voltage into a first direct current (DC) voltage, to provide the boost converter with one of the first DC voltage and a second DC voltage of the battery component, and to generate a first mode selection signal when the first DC voltage is selected among the first DC voltage and the second DC voltage. Here, the boost converter may select the first mode based on the first mode selection signal.

Example embodiments may be related to a method of operating a boost converter. The boost converter includes a first transistor electrically connected between a reference voltage level and an input terminal which receives an input voltage, a second transistor electrically connected between the input terminal and an output terminal, and a diode electrically connected parallel to the second transistor. The method may include the following steps: comparing the input voltage with each of a first reference voltage level and a second reference voltage level, the second reference voltage level being lower than the first reference voltage level by an input threshold level; and selecting a second mode when the input voltage has been lower than the second reference voltage level for a reference time. The boost converter may generate an output voltage using the first transistor and the diode in the second mode.

In example embodiments, the method may further include selecting a first mode when the input voltage is higher than the first reference voltage level. Here, the boost converter generates the output voltage using the first transistor and the second transistor in the first mode.

In example embodiments, the selecting the second mode may include generating a second mode selection signal when the input voltage is lower than the second reference voltage level; and delaying outputting of the second mode selection signal for the reference time.

In example embodiments, the delaying outputting of the second mode selection signal may include extinguishing the second mode selection signal when the first mode selection signal is generated within the reference time.

In example embodiments, the selecting the second mode may include selecting the second mode based on the second mode selection signal when the second mode selection signal is output at an end time point of the reference time.

In example embodiments, the input threshold level is variable.

In example embodiments, the reference time is variable.

In example embodiments, the method may further include selecting a first mode when the first mode selection signal is provided from an external component; and performing a step for comparing the input voltage and the first and second reference voltage levels and a step for selecting the second mode, repeatedly. Here, the boost converter may generate the output voltage using the first transistor and the second transistor in the first mode.

Some example embodiments may be related to a power converter. The power converter may include the following elements: an input terminal for receiving an input voltage; an output terminal for providing an output voltage; a reference member for receiving a reference voltage; a first transistor electrically connected between the reference member and the input terminal; a second transistor electrically connected between the input terminal and the output terminal; a diode electrically connected parallel to the second transistor; and a controller for selecting a first mode if the input voltage is greater than a first reference voltage level and for selecting a second mode if the input voltage has been less than a second reference voltage level for a reference time period. The first transistor and the diode may generate the output voltage in the first mode. The first transistor and the second transistor may generate the output voltage in the second mode.

The controller may control the first transistor and the second transistor to be alternately turned on in the second mode.

The controller may control the second transistor to be turned off in the first mode.

The controller may include the following elements: a comparator for comparing the input voltage with at least one of the first reference voltage level and the second reference voltage level; and a mode determiner for selecting one of the first mode and the second mode based on a comparison result of the comparator and based on whether the reference time period has expired.

The controller may include a control signal generator for generating a first control signal for the first transistor and a second control signal for the second transistor based on a selected one of the first mode and the second mode.

The controller may include a determiner for setting the first reference voltage level, the second reference voltage level, and the reference time period.

The controller may set the second reference voltage level based on the first reference voltage level and an input threshold voltage.

The second reference voltage level may be lower than the first reference voltage level by the input threshold voltage.

The determiner may select a first reference time length among a plurality of reference time lengths to be the reference time period.

The power converter may include a control component electrically connected to the controller for providing a mode selection signal. The controller may receive the mode selection signal from the control component and may select one of the first mode and the second mode based on the mode selection signal.

Some example embodiments may be related to a display device. The display device may include a display panel and a power converter. The power converter may generate an output voltage using an input voltage and may provide the output voltage to the display panel. The power converter may include the following elements: an input terminal for receiving the input voltage; an output terminal for providing the output voltage; a reference member for receiving a reference voltage; a first transistor electrically connected between the reference member and the input terminal; a second transistor electrically connected between the input terminal and the output terminal; a diode electrically connected in parallel with the second transistor; and a controller for selecting a first mode if the input voltage is greater than a first reference voltage level and for selecting a second mode if the input voltage has been less than a second reference voltage level for a reference time period. The power converter may generate the output voltage using the first transistor and the diode in the first mode. The power converter may generate the output voltage using the first transistor and the second transistor in the second mode.

The display device may include a power controller. The power converter may convert an external voltage into a first direct current voltage, may provide the power converter with one of the first direct current voltage and a second direct current voltage received from a battery component, and may generate a first mode selection signal if the first direct current voltage is selected to be provided to the power converter. The power converter may select the first mode based on the first mode selection signal.

Some example embodiments may be related to a method of operating a power converter. The method may include the following steps: receiving an input voltage using an input terminal of the power converter; receiving a reference voltage using a reference member of the power converter; outputting an output voltage using an output terminal of the power converter; comparing the input voltage with a first reference voltage level and with a second reference voltage level, the second reference voltage level being lower than the first reference voltage level; if the input voltage is higher than the first reference voltage level, selecting a first mode to use a first transistor of the power converter and a diode of the power converter to generate the output voltage, wherein the first transistor may be electrically connected between the reference member and the input terminal, and wherein the diode may be electrically connected between the input terminal and the output terminal; if the input voltage has been lower than the second reference voltage level for a reference time period, selecting a second mode to use the first transistor and a second transistor of the power converter to generate the output voltage, wherein the second transistor may be electrically connected between the input terminal and the output terminal in parallel with the diode.

The method may include the following steps: determining an input threshold voltage; and determining the second reference voltage level such that the second reference voltage level may be equal to the first reference voltage level minus the input threshold voltage.

The method may include the following steps: generating a mode selection signal in response to a condition that the input voltage may be lower than the second reference voltage level; and delaying outputting of the mode selection signal until expiration of the reference time period.

The method may include the following steps: generating a first mode selection signal within the reference time period; and canceling a second mode selection signal in response to generation of the first mode selection signal. The second mode selection signal may have been generated responsive to a condition that the input voltage may be lower than the second reference voltage level.

The method may include the following steps: generating a mode selection signal responsive to a condition that the input voltage may be lower than the second reference voltage level; and selecting the second mode in response to the second mode selection signal when the reference time period has expired.

The method may include the following steps: determining a first input threshold voltage according to a first operating condition; determining a first value of the second reference voltage level using the first reference voltage level and the first input threshold voltage; determining a second input threshold voltage according to a second operating condition; and determining a second value of the second reference voltage level using the first reference voltage level and the second input threshold voltage.

The method may include the following steps: determining a first length for the reference time period according to a first operating condition; using the first length for the reference time period in a first operation of the power converter; determining a second length for the reference time period according to a second operating condition; and using the second length for the reference time period in a second operation of the power converter.

The method may include the following steps: if the input voltage is less than the first reference voltage level, repeatedly comparing the input voltage with the second reference voltage level before expiration of the reference time period.

A power converter, e.g., a boost converter, according to example embodiments may prevent unnecessary mode switching caused by noise.

In embodiments, a power converter may mitigate (or reduce) impact of noise on an output voltage by changing (or adjusting) a second reference voltage level and/or by adjusting a difference between reference voltage levels.

A display device according to example embodiments may display images with satisfactory quality even if there is variation is driving voltages.

A method of operating a power converter according to example embodiments may minimize output voltage fluctuation even if there is input voltage variation and may therefore enable the power converter to provide a substantially stable output voltage.

DESCRIPTION OF EMBODIMENTS

Example embodiments are described with reference to the accompanying drawings. Although the terms "first", "second", etc. may be used herein to describe various elements, these elements, should not be limited by these terms. These terms may be used to distinguish one element from another element. Thus, a first element discussed below may be termed a second element without departing from the teachings of the present invention. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively. The term "connect" may mean "electrically connect", "directly connect", or "indirectly connect". The term "insulate" may mean "electrically insulate". The term "conductive" may mean "electrically conductive". The term "electrically connected" may mean "electrically connected without any intervening transistors". If a component (e.g., a transistor) is described as connected between a first element and a second element, then a source/drain/input/output terminal of the component may be electrically connected to the first element through no intervening transistors, and a drain/source/output/input terminal of the component may be electrically connected to the second element through no intervening transistors.

Figure 1:
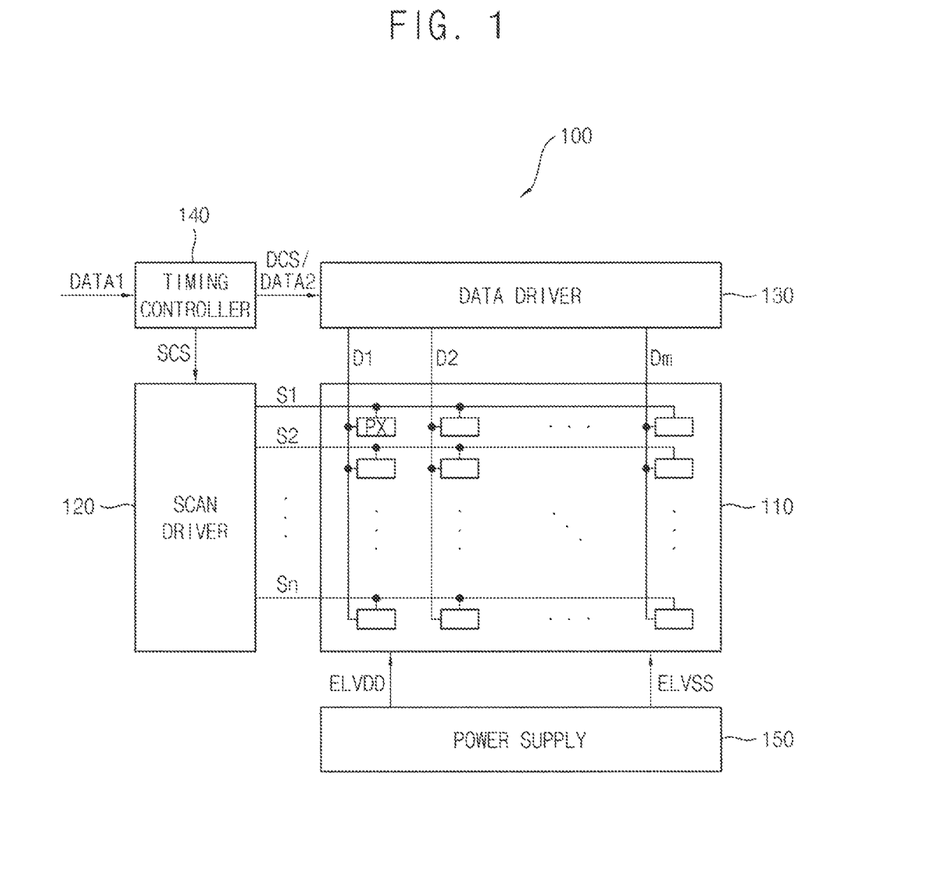
FIG. 1 is a block diagram illustrating a display device according to example embodiments.

FIG. 1 is a block diagram illustrating a display device according to example embodiments.

Referring to FIG. 1, the display device 100 may include a display panel 110, a scan driver 120, a data driver 130, a timing controller 140, and a power supply 150. The display device 100 may display an image based on image data (e.g., first image data DATA1) provided from an external component. For example, the display device 100 may be an organic light emitting display device.

The display panel 110 may include gate lines S1 through Sn, data lines D1 through Dm, and pixels 111, where each of n and m is an integer greater than or equal to 2. The pixels 111 may be located in cross-regions of the gate lines S1 through Sn and the data lines D1 through Dm, respectively. The pixels 111 may store data signals (e.g., data signals provided through the data lines D1 through Dm) in response to scan signals (e.g., scan signals provided through the scan lines S1 through Sn) and may emit light based on stored data signals.

The scan driver 120 may generate the scan signals based on a scan driving control signal SCS. The scan gate driving control signal SCS may include a start signal (or, a start pulse) and clock signals, and the scan driver 120 may include shift registers sequentially generating the scan signals based on the start signal and the clock signals.

The data driver 130 may generate the data signals in response to a data driving control signal DCS. The data driver 130 may convert the image data (e.g., second image data DATA2) in a digital form into the data signals in an analog form. The data driver 130 may generate the data signal signals based on predetermined grayscale voltages (or gamma voltages), where the grayscale voltages may be provided from a gamma circuit to the data driver 130. The data driver 130 may sequentially provide the data signals to the pixels 111.

The scan driver 120 and the data driver 130 may be included in a driving integrated circuit.

The timing controller 140 may receive the image data (e.g., the first image data DATA1) and input control signals (e.g., a horizontal synchronous signal, a vertical synchronous signal and clock signals) form an external component and may generate compensated image data (e.g., the second data DATA2) which is suitable for the display panel 110 to display an image. In embodiments, the timing controller 140 may control the scan driver 120 and the data driver 130. The timing controller 160 may generate the scan driving control signal SCS and the data driving control signal DCS.

The power supply 150 may generate driving voltages and may provide the driving voltages to the display panel 110 (or the pixels 111). Here, the driving voltages may be requested power voltage to drive the pixels 111. For example, the driving voltages may include a first power voltage ELVDD and a second power voltage ELVSS. Her, the first power voltage ELVDD may have a voltage level greater (or higher) than a voltage level of the second power voltage ELVSS.

Figure 2:
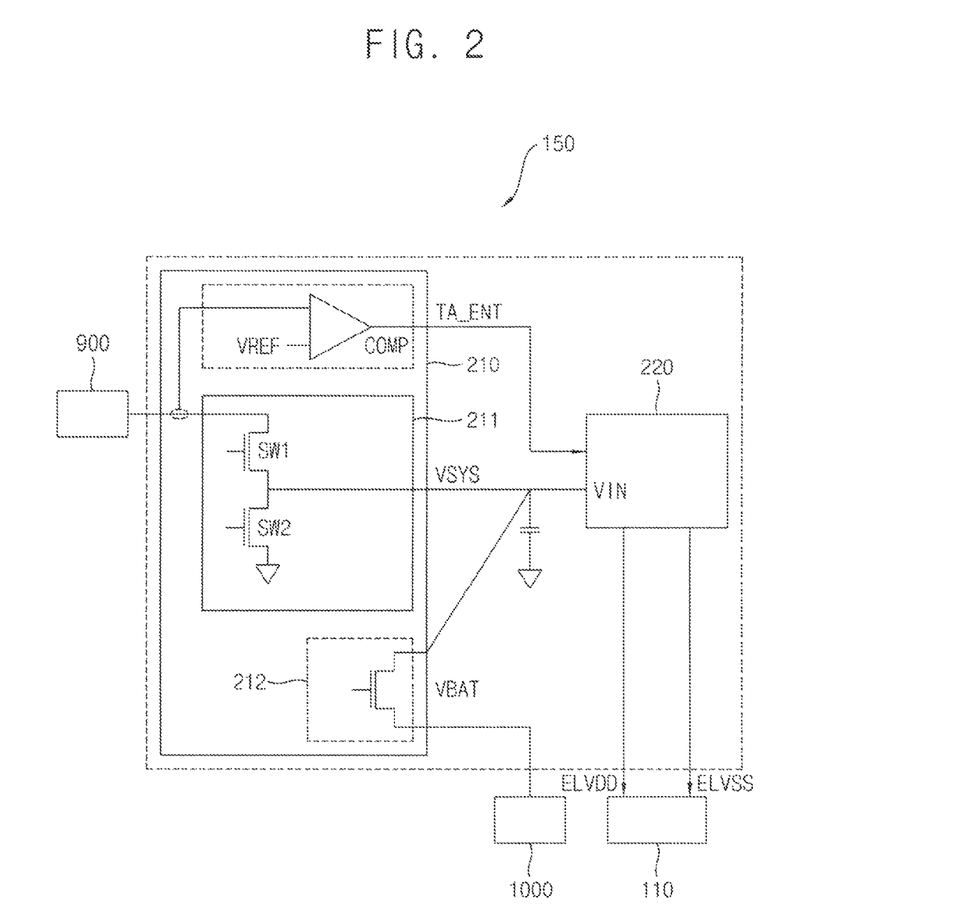
FIG. 2 is a diagram (e.g., a circuit diagram) illustrating an example embodiment of a power supply included in the display device of FIG. 1.

FIG. 2 is a diagram (e.g., a circuit diagram) illustrating an example embodiment of a power supply included in the display device of FIG. 1.

Referring to FIGS. 1 and 2, the power supply 150 may include a power controller 210 and a power converter 220.

The power controller 210 may convert an external voltage (or an external power) into a first direct current (referred as "DC") voltage VSYS and may provide the power converter 220 with an input voltage VIN by selecting one of the first DC voltage VSYS and a second DC voltage VBAT. In embodiments, the external voltage may be a voltage provided form an external charging device 900, for example, the external voltage may have a voltage in a range of 5 through 9 volts (V). The first DC voltage VSYS may be a voltage generated by the power voltage 210, for example, the first DC voltage VSYS may be 4.8 V. The second DC voltage VBAT may be a voltage supplied by a battery device 1000, for example, the second DC voltage VBAT may be less than 4.4 V. In embodiments, the power converter 220 may generate a driving voltage (e.g., the first power voltage ELVDD and/or the second power voltage ELVSS) based on the input voltage VIN and may provide the driving voltage to the display panel 110.

The power controller 210 may include a buck converter 211 and a battery switch 212. The buck converter 211 may receive the external voltage from the external charging device 900 (e.g., a charger) and may convert the first DC voltage VSYS by reducing the external voltage. For example, the buck converter 211 may include a first switch SW1 electrically connected between an input terminal and an output terminal and a second switch SW2 electrically connected between the output terminal and a reference voltage (e.g., a ground voltage). In embodiments, the input terminal may receive the external voltage, the output terminal may output the first DC voltage VSYS, and each of the first and second switches SW1 and SW2 may be implemented as a transistor. The buck converter 211 may output the first DC voltage VSYS by periodically turning on/off the first and second switches SW1 and SW2. The buck converter 211 may be implemented as a general buck converter.

The battery switch 212 may be electrically connected between the output terminal of the buck converter 211 (or an input terminal of the power converter 220) and battery device 1000. When the battery switch 212 is turned on, the first DC voltage VSYS (e.g., the first DC voltage VSYS output through the output terminal of the buck converter 211) may be provided to the battery device 1000. In embodiments, the battery device 1000 may be charged with the first DC voltage VSYS. When the battery switch 212 is turned on and when the first DC voltage VSYS is less (or lower) than a certain voltage level (e.g., when the first DC voltage VSYS is not supplied), the second DC voltage VBAT of the battery device 1000 may be provided to the power converter 220.

In some example embodiments, the power controller 210 may generate a mode selection signal TA_ENT based on the external voltage provided from the external charging device 900 and may provide the mode selection signal TA_ENT to the power converter 220. For example, the power controller 210 may sense the external voltage, may compare with the external voltage and a certain voltage (e.g., a reference voltage Vref), and may generate the mode selection signal TA_ENT having a logic high level (e.g., a first mode selection signal) when the external voltage is greater than the certain voltage (e.g., when the external voltage is supplied). For example, the power controller 220 may generate the mode selection signal TA_ENT having a logic low level (e.g., a second mode selection signal) when the external voltage is less than the certain voltage (e.g., when the external voltage is not supplied).

As illustrated in FIG. 2, the power controller 210 may generate the mode selection signal TA_ENT using a voltage comparator COMP. The voltage comparator COMP may receive the external voltage and a certain voltage, may output a first mode selection signal when the external voltage is greater than the certain voltage, and may output a second mode selection signal when the external voltage is less than the certain voltage. For example, the voltage comparator COMP may be implemented as an amplifier or a differential amplifier. The power converter 220 may determine an operation mode based on the mode selection signal TA_ENT. The operation mode and an operation of the power converter 220 will be described in detail with reference to FIGS. 3 through 8.

Figure 3:
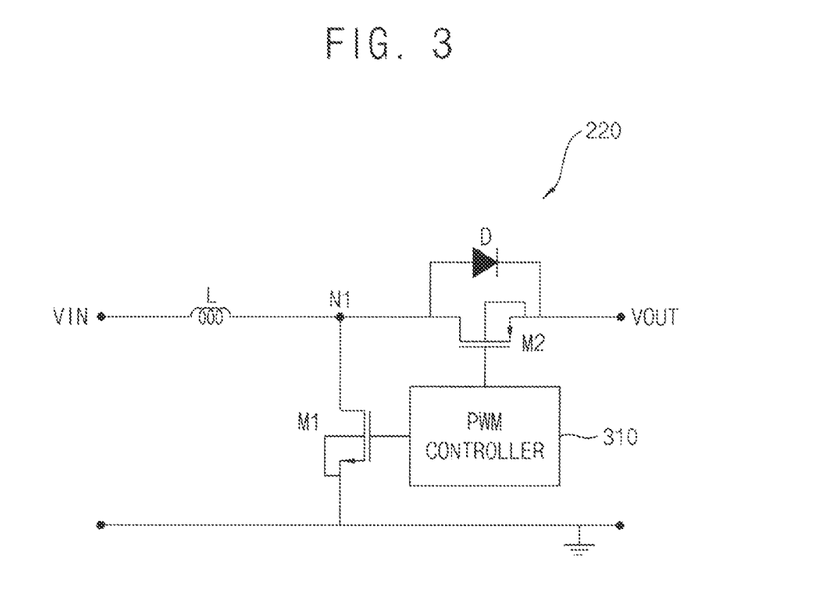
FIG. 3 is a diagram (e.g., a circuit diagram) illustrating an example embodiment of a power converter, e.g., a boost converter, included in the power supply of FIG. 2.
Figure 4:
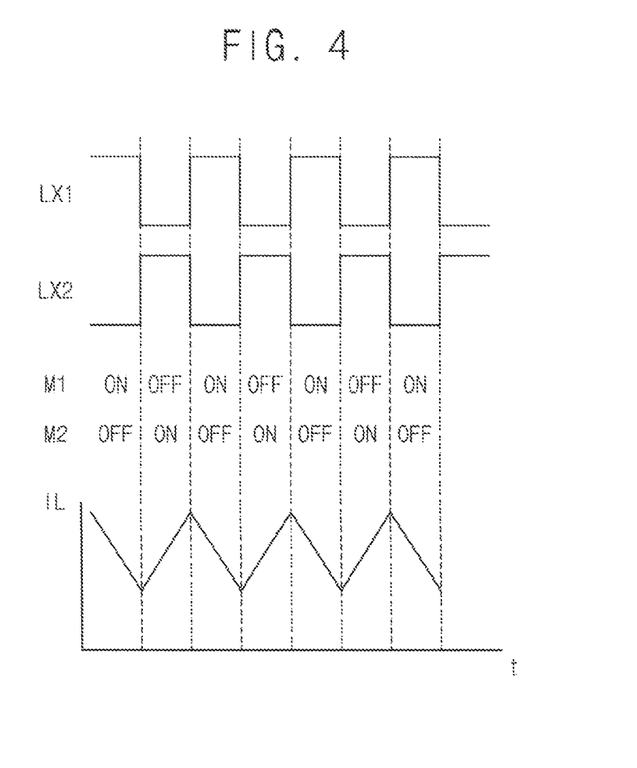
FIG. 4 is a voltage waveform diagram illustrating an operation of the boost converter of FIG. 3 according to example embodiments.

FIG. 3 is a diagram illustrating an example embodiment of a power converter included in the power supply of FIG. 2. FIG. 4 is a voltage waveform diagram illustrating an operation of the power converter, of FIG. 3 according to example embodiments.

Referring to FIG. 3, the power converter 220 may include an inductor L, a first transistor M1, a second transistor M2, a diode D, and a controller 310.

The inductor L may be electrically connected between an input terminal of the power converter 220 and each of a first node N1, the first transistor M1, and the second transistor M2. The first transistor M1 may be electrically connected between the first input terminal (or the first node N1) and a reference member that receives a reference voltage (e.g., a ground voltage). The second transistor M2 may be electrically connected between the input terminal of the power converter 220 (or the first node N1) and an output terminal of the power converter 220. The diode D may be electrically connected in parallel with the second transistor M2. That is, the diode D may be electrically connected between the input terminal of the power converter 220 (or the first node N1) and the output terminal of the power converter 220.

The controller 310 (e.g., a pulse width modulation controller, PWM controller) may determine the operation mode of the power converter 220 based on the input voltage VIN and may control the transistors M1 and M2 based on the operation mode. In embodiments, available operation modes may include a first mode (or asynchronous mode) and a second mode (or synchronous mode). In example embodiments, the power converter 220 may generate the output voltage using the transistors M1 and M2 in the first mode. In example embodiments, the power converter 220 may generate the output voltage using the first transistor M1 and the diode D in the second mode.

For reference, the second mode may be a step-up mode (or a normal operation mode) of the power converter 220, and the power converter 220 may output the output voltage VOUT to be higher than the input voltage VIN, which may have a relatively low voltage level. In embodiments, the power converter 220 may output the output voltage VOUT having a voltage level not much higher than a requested voltage level when the input voltage VIN has a relatively high voltage level. For example, the power converter 220 may output a voltage not much higher than the first power voltage ELVDD used in the display panel 110. In embodiment, the power converter 220 may output the output voltage VOUT (e.g., substantially equal to the first power voltage ELVDD suitable for the display panel 110) lower than the input voltage VIN, which may be a relatively high voltage, using the diode D. That is, the first mode may be a step-down mode (or an abnormal mode) of the power converter 220.

In some example embodiments, the controller 310 may select the first mode when the input voltage VIN is higher than a first reference voltage level and may select the second mode when the input voltage VIN is lower than a second reference voltage level for a reference time.

In the second mode, the controller 310 may alternately turn on the first transistor M1 and the second transistor M2. In the first mode, the controller 310 may periodically (or repeatedly) turn on and off the first transistor M1 and may turn off the second transistor M2 (or may maintain the second transistor M2 in a turn-off state).

Referring to FIG. 4, the controller 310 may generate a first control signal LX1 and a second control signal LX2 in the second mode. The first control signal LX1 may be a square wave which has a logic high level (or a turn-on level, a high voltage level) and a logic low level (or a turn-off level, a low voltage level) alternately and periodically over time. The second control signal LX2 may be a square wave and may be an inverted signal of the first control signal LX1. For example, the second control signal LX2 may have a logic low level when the first control signal LX1 has a logic high level. For example, the second control signal LX2 may have a logic high level when the first control signal LX1 has a logic low level.

When the first transistor M1 is turned on and the second transistor is turned off in response to the control signals LX1 and LX2, an inductor current IL flowing through the inductor L may increase such that an associated voltage may decrease. When the first transistor M1 is turned off and the second transistor is turned on, the inductor current may decrease such that the induction voltage may increase. In embodiments, the controller 310 may control (or adjust, change) magnitude of the inductor current (IL) by controlling (or by changing) an on-duty (e.g., a time in which the first transistor M1 is turned on) and/or an off-duty (e.g., a time in which the first transistor M1 is turned off). Therefore, the power converter 220 may output the output voltage VOUT (e.g., the first power voltage ELVDD) having a substantially constant voltage level which is suitable for the display panel 110 even if the input voltage VIN varies (within a certain range). In embodiments, the power converter 220 may output a driving voltage not equal to the first power voltage ELVDD when the input voltage VIN is out of the certain range (e.g., when the input voltage VIN is greater than the first reference voltage level) because a controllable range of the on-duty (or off-duty) of the first transistor M1 is limited within a period of the first control signal LX1 (i.e., a maximum value of the on-duty time of the first transistor M1 is not greater than the period of the first control signal LX1).

In the first mode, the first control signal LX1 may be a square wave which has a logic high level (or a turn-on level, a high voltage level) and a logic low level (or a turn-off level, a low voltage level) alternately and periodically over time. In embodiments, the first control signal LX1 in the first mode may be the same as the first control signal LX1 in the second mode. The second control signal LX2 may remain a logic low level in the first mode. In embodiments, the output voltage VOUT may be reduced by the diode D. Therefore, even if the input voltage VIN is out of the certain range (e.g., the input voltage VIN is greater than the first reference voltage level), the power converter 220 may output an output voltage VOUT (e.g., equal to the first power voltage ELVDD) suitable for the display panel 110 and lower than the input voltage VIN using the diode D.

Figure 5:
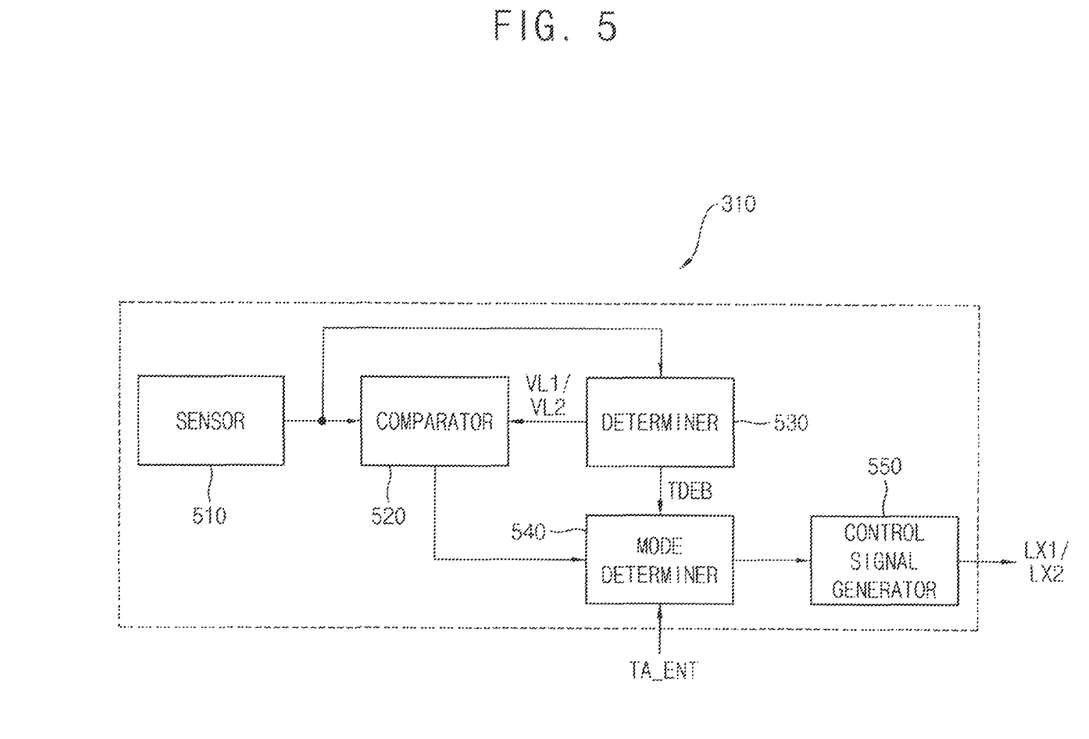
FIG. 5 is a block diagram illustrating an example embodiment of a controller included in the power converter, e.g., a boost converter, of FIG. 3.
Figure 6:
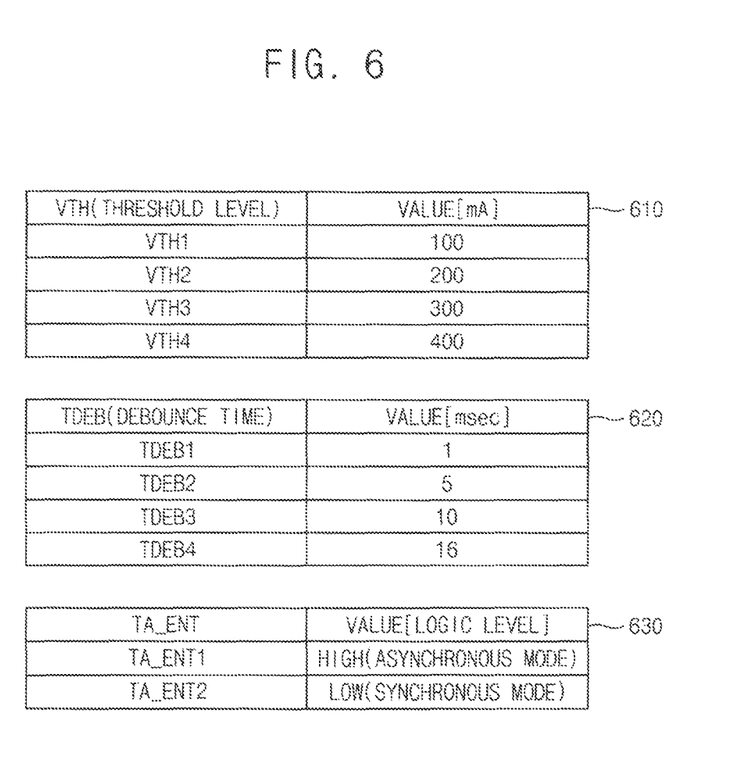
FIG. 6 is a diagram illustrating an example embodiment of a look-up table used in the controller of FIG. 5.

FIG. 5 is a block diagram illustrating an example of controller included in the power converter of FIG. 3. FIG. 6 is a diagram illustrating an example of a look-up table used in the controller of FIG. 5.

Referring to FIGS. 3 and 5, the controller 310 may include a sensor 510, a comparator 520, a determiner 530, a mode determiner 540, and a control signal generator 550.

The sensor 510 may sense the input voltage VIN provided to the power converter 220. For example, the sensor 510 may be a buffer amplifier which is electrically connected to the input terminal of the power converter 220. It is illustrated in the sensor is included in the controller 310 in FIG. 5. In embodiments, the sensor 510 is not limited thereto.

The comparator 520 may compare the input voltage VIN with each of the reference voltage levels VL1 and VL2. For example, the comparator 520 may be implemented as a differential amplifier which amplifies a difference between the input voltage VIN and the first reference voltage level VL1. For example, the comparator 520 may be implemented as a differential amplifier which amplifies a difference between the input voltage VIN and the second reference voltage level VL2.

The determiner 530 may determine the first reference voltage level VL1, a second reference voltage level VL2, and a reference time TDEB (or reference time period). In embodiments, the first reference voltage level VL1 may be predetermined based on a driving voltage (e.g., the first power voltage ELVDD) requested in (or suitable for) the display panel 110. For example, when the first power voltage ELVDD requested in the display panel 110 is 4.6 V, the first reference voltage level VL1 may be 4.5 V.

In some example embodiments, the determiner 530 may determine the second reference voltage level VL2 based on the first reference voltage level VL1 and an input threshold level VTH (or an input threshold voltage). In embodiments, the input threshold level VTH may be set to avoid sudden mode switching. In embodiments, the input threshold level VTH may be equal to a difference between the first reference voltage level LV1 and the second reference voltage level LV2. The power converter 220 may prevent sudden mode switching (and/or frequent mode switching) potentially caused by noise in the input voltage VIN setting a suitable input threshold level VTH. The determiner 530 may determine the second reference voltage level VL2 such that the second reference voltage level VL2 may be equal to the first reference voltage level VL1 minus the input threshold level VTH.

In embodiments, the power converter 220 may perform no mode switching when the input voltage VIN is less than the first reference voltage level VL1 and greater than the second reference voltage level VL2 (e.g., when a variation of the input voltage VIN is within the input threshold level VTH).

Referring to FIG. 6, a first look-up table 610 may include input threshold level VTH1, VTH2, VTH3, and VTH4. In embodiments, the input threshold level VTH1 through VTH4 may be determined based on driving/operating conditions of the display device 100. For example, the first input threshold level VTH1 may be determined considering that the display device 100 is included in a media player to only display images. In embodiments, the first threshold level VTH1 may be 100 mV. For example, the third input threshold level VTH3 may be determined considering that the display device 100 is included in a mobile device. In embodiments, the third threshold level VTH3 may be 300 mV considering a voltage drop (e.g., 200 mV) of the input voltage VIN due to a data communication (e.g., a GSM call) and/or due to operation of other applications of the mobile device.

In some example embodiments, the controller 310 (or the determiner 530) may select one of the input threshold levels VTH1 through VTH4. For example, the controller 310 (or the determiner 530) may select one of the input threshold levels VTH1 through VTH4 based on a driving/operating condition of the display device 100 and/or the power converter 220. In embodiments, the controller 310 (or the determiner 530) may determine the second reference voltage level VL2 based on the first reference voltage level VL1 and the selected one of the input threshold levels VTH1 through VTH4. For example, the second reference voltage level VL2 may be lower than the first reference voltage level VL1 by the selected one of the input threshold levels VTH1 through VTH4.

It is illustrated that the first look-up table 610 includes four input threshold levels VTH1 through VTH4 in FIG. 6. However, the first look-up table 610 is not limited thereto. For example, the first look-up table 610 may include input threshold levels of which a number is 2, 3, or greater than 5.

A second look-up table 620 may include reference times TDEB1, TDEB2, TDEB3, and TDEB4. In embodiments, the reference times TDEB1 through TDEB4 may be a waiting time (or, a stay time) before performing mode switching and may represent a voltage drop period associated with a relative low level of the input voltage VIN. Similarly to the input threshold levels VTH1 through VTH4, the reference times TDEB1 through TDEB4 may be determined based on driving/operating conditions of the display device 100. For example, the first reference time TDEB1 may be determined considering that the display device 100 is included in a media player to only display images. For example, the first reference time TDEB1 may be 1 millisecond (msec). For example, the fourth reference time TDEB4 may be determined considering that the display device 100 is included in a mobile device. For example, the fourth reference time TDEB4 may be 16 msec considering a voltage drop (or a voltage drop period) of the input voltage VIN, which may occur repeatedly, e.g., due to a GSM call of the mobile device.

In some example embodiments, the controller 310 (or the determiner 530) may select one of the reference times TDEB1 through TDEB4. For example, the controller 310 (or the determiner 530) may select one of the reference times TDEB1 through TDEB4 based on the driving/operating condition of the display device 100 and/or the power converter 220. In embodiments, the controller 310 (or the determiner 530) may configure an operation mode of the power converter 220 based the selected one of the reference times TDEB1 through TDEB4.

Referring again to FIG. 5, the mode determiner 540 may select one of the first mode and the second mode based on a comparison result of the comparator 520 and based on whether the reference time TDEB has expired. In example embodiments, if the input voltage VIN is greater than the first reference voltage level VL1, the mode determiner 540 may select the first mode. In example embodiments, if the input voltage VIN has been less than the second reference voltage level VL2 continuously for the reference time TDEB, the mode determiner 540 may select the second mode. That is, the mode determiner 540 may select the second mode when the input voltage VIN has been less than the second reference voltage level VL2 over the reference time TDEB, not immediately when the input voltage VIN is/becomes less than the second reference voltage level VL2. Therefore, the mode determiner 540 may prevent unnecessary mode switching, which may cause instability of the output voltage VOUT.

In some example embodiments, the mode determiner 540 (or the controller 310) may receive the mode selection signal TA_ENT from the power controller 210, an component external to the power converter 220, and may select one of the first mode and the second mode based on the mode selection signal TA_ENT.

Referring again to FIG. 6, a third look-up table 630 may include mode selection signals TA_ENT1 and TA_ENT2. In embodiments, the mode selection signals TA_ENT1 and TA_ENT2 may represent a state of connection between the power controller 210 (or the buck converter 211, the power supply 150, the display device 100) and the external charging device 900. In example embodiments, the first mode selection signal TA_ENT1 may represent a state in which the power converter 200 is connected to the external charging device 900. In example embodiments, when a connection with the charging device 900 is enabled, the power controller 210 may generate the first mode selection signal TA_ENT1 and may provide the first mode selection signal TA_ENT1 to the power converter 220 (or the controller 310, the mode determiner 540). In embodiments, the mode determiner 540 may select the first mode regardless of a determination result of the comparator 520.

In example embodiments, the second mode selection signal TA_ENT2 may represent a state in which the power converter 200 is disconnected from the external charging device 900. For example, when the charging device 900 is disconnected, the power controller 210 may generate the second mode selection signal TA_ENT2 and may provide the second mode selection signal TA_ENT2 to the power converter 220 (or the controller 310, the mode determiner 540). In embodiments, the mode determiner 540 may select the second mode regardless of a determination result of the comparator 520.

In example embodiment, when the display device 100 is connected to the external charging device 900, the first DC voltage VSYS provided through the external charging device 900 (or the first DC voltage VSYS generated based on the external voltage of the external charging device 900) may be greater than the first reference voltage level VL1. In embodiments, the mode determiner 540 may predict (or anticipate) a mode switching (e.g., a mode switching from the first mode to the second mode). In embodiments, the power converter 220 may fundamentally block unnecessary change of the output voltage VOUT by prohibiting unnecessary mode switching.

In embodiments, the power converter 220 may perform a suitable mode switching more quickly than a power converter which determines the operation mode through the sensor 510, the comparator 520, and etc. The power converter 220 may operate in the first mode as soon as the display device 100 is connected to the external charging device 900. In embodiments, the power converter 220 may prevent (or mitigate) instability of the output voltage VOUT (e.g., an overshooting of the first power voltage ELVDD). In example embodiments, when the display device 100 is disconnected from the external charging device 900, the power converter 220 may receive the second DC voltage VBAT of the battery device 1000 as the input voltage VIN. In embodiments, the second DC voltage VBAT may be less than the second reference voltage level VL2. In embodiments, the mode determiner 540 may predict (or anticipate) a mode switching (e.g., a mode switching from the second mode to the first mode). The power converter 220 may perform a timely and suitable mode switching. The power converter 220 may operate in the second mode as soon as the display device 100 is disconnected to the external charging device 900 or at suitable time after the disconnection. In embodiments, the power converter 220 may prevent (or mitigate) instability of the output voltage VOUT (e.g., an undershooting of the first power voltage ELVDD).

Referring again to FIG. 5, the control signal generator 550 may generate the first control signal LX1 to control the first transistor M1 and the second control signal LX2 to control the second transistor M2 based on the selected one of the first mode and the second mode. As described with reference to FIG. 4, the control signal generator 550 may generate the control signals LX1 and LX2 each having a square wave in the second mode. In embodiments, the control signal generator 550 may generate the first control signal LX1 having a square wave and the second control signal LX remaining a logic low level in the first mode.

As described with reference to FIGS. 5 and 6, the controller 310 may sense the input voltage VIN, may control for the power converter 220 to operate in the first mode (e.g., an asynchronous mode) when the input voltage VIN is greater than the first reference voltage level VL1, and may control for the power converter 220 to operate in the second mode (e.g., a synchronous mode) when the input voltage VIN has been less than the second reference voltage level VL2 for (or throughout) the reference time TDEB. In embodiments, the controller 310 may change the second reference voltage level VL2 (or the input threshold level VTH) and/or the reference time TDEB according to operating conditions of the power converter 220 and/or the display device 100. Therefore, the controller 310 may prevent (or mitigate) undesirable change (e.g., an overshooting or an undershooting) of the output voltage VOUT. In embodiments, the controller 310 may enable suitable and/or timely mode switching based on a mode selection signal which is generated based on anticipation of mode switching of the power converter 220. Therefore, the controller 310 may prevent unnecessary or undesirable change of the output voltage VOUT.

Figure 7A:
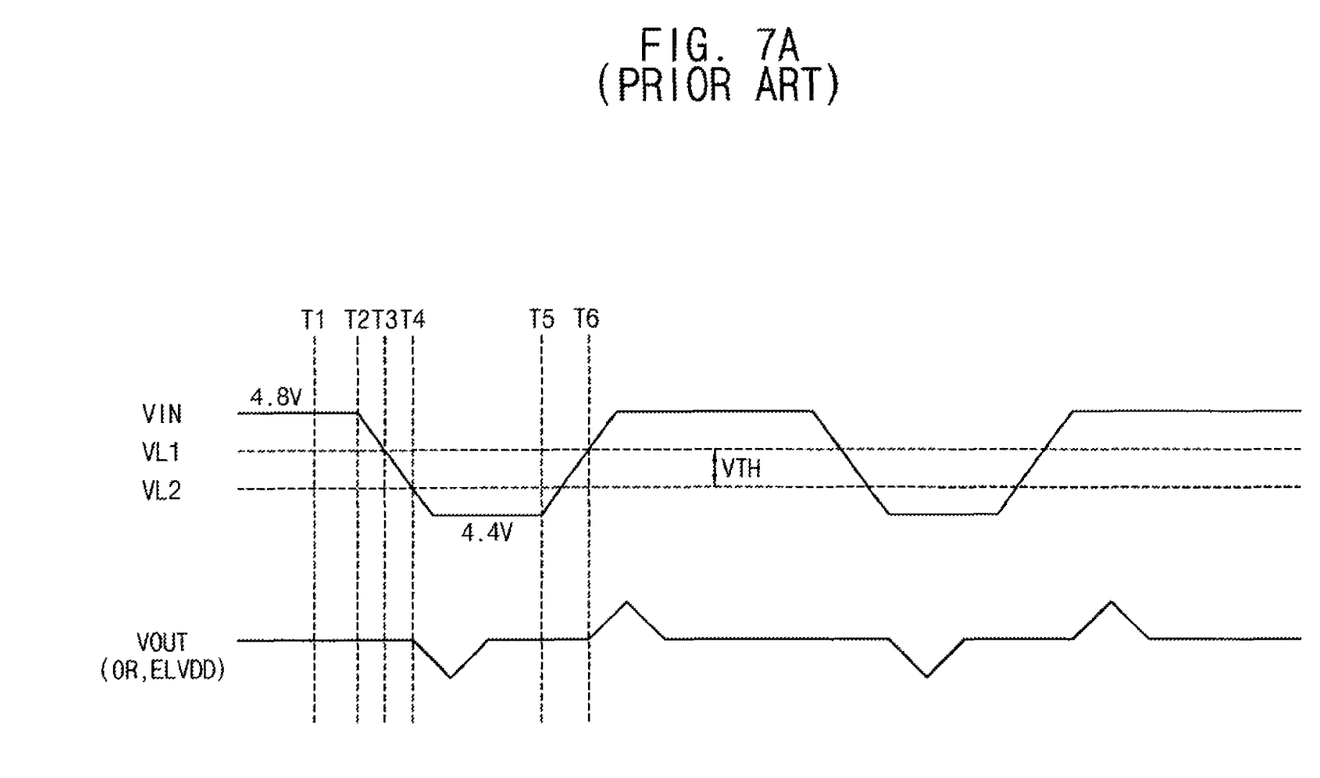
FIG. 7A is a voltage waveform diagram illustrating a comparative example of an output voltage of the power converter, e.g., a boost converter, of FIG. 3.
Figure 7B:
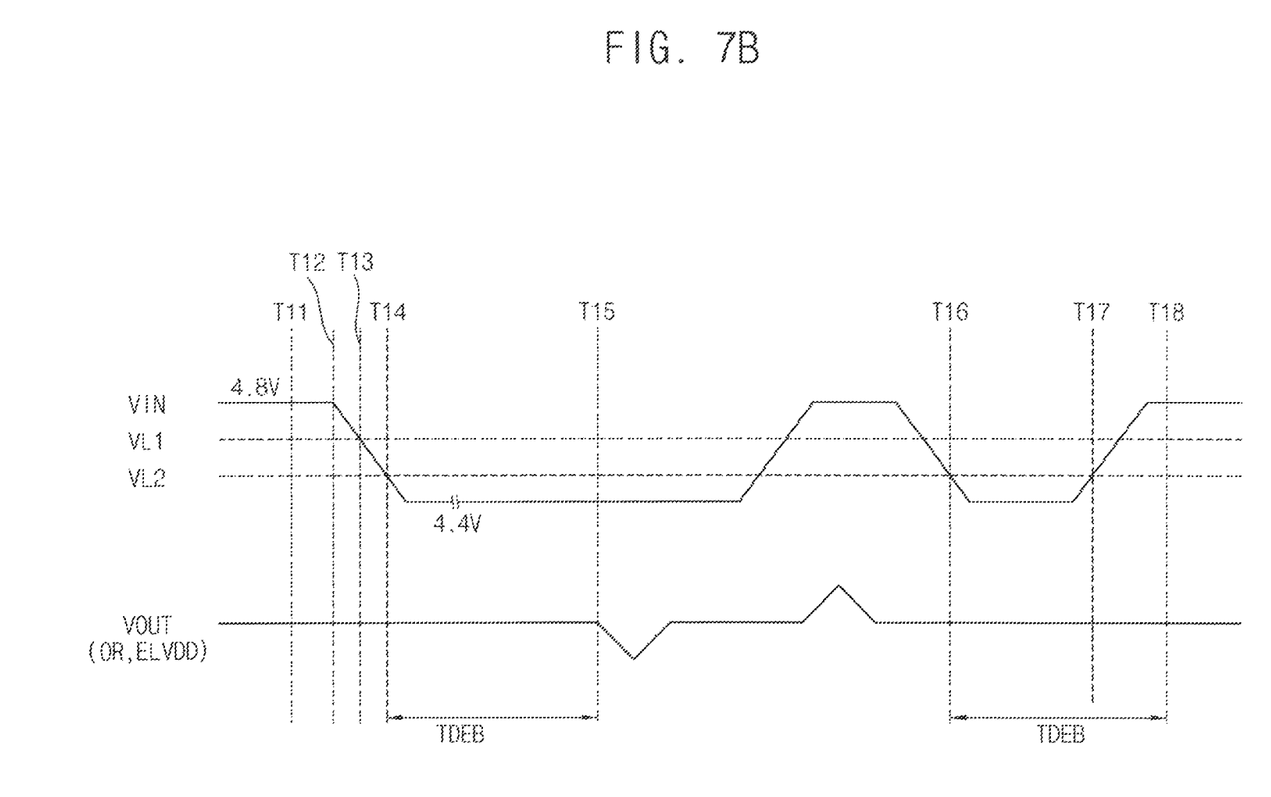
FIG. 7B is a voltage waveform diagram illustrating an example of an output voltage of the power converter, e.g., a boost converter, of FIG. 3.

FIG. 7A is a voltage waveform diagram illustrating a comparative example embodiment of an output voltage of the power converter of FIG. 3. FIG. 7B is a voltage waveform diagram illustrating an example embodiment of an output voltage of the power converter of FIG. 3.

Referring to FIGS. 3 and 7A, a power converter may operate in one of the first and second modes based on the input voltage VIN. For example, the power converter operates in the first mode when the input voltage VIN is greater than the first reference voltage level VL1 and operates in the second mode when the input voltage VIN is less than the second reference voltage level VL2. In embodiments, the first reference voltage level VL1 is 4.5 V, and the second reference voltage level VL2 is 4.4 V. That is, the input threshold level VTH is 100 mV.

As illustrated in FIG. 7A, at a first time point T1, the input voltage VIN is 4.8 V, and the power converter operates in the first mode.

At a second time point T2, the input voltage VIN is reduced. At a third time point T3, the input voltage VIN is 4.5 V. The power converter maintains the first mode because the power converter does not operate in the second mode when the input voltage VIN is greater than the second reference voltage level VL2 (e.g., 4.4 V).

At a fourth time point T4, the input voltage VIN is less than the second reference voltage level VL2, and the power converter performs mode switching from the first mode to the second mode. A change (e.g., an undershooting) of the output voltage (e.g., the first power voltage ELVDD) occurs due to the mode switching form the first mode to the second mode.

After this, the power converter operates in the second mode before the input voltage VIN is changed (e.g., increased).

At a fifth time point T5, the input voltage increases, and at a sixth time point T6, the input voltage VIN is greater than the first reference voltage level VL1 of 4.5 V. In embodiments, the power converter performs mode switching from the second mode to the first mode. A change (e.g., an overshooting) of the output voltage (e.g., the first power voltage ELVDD) occurs due to the mode switching form the second mode to the second first mode.

The power converter may perform mode switching to instantly react to a change of the input voltage VIN. The power converter may frequently perform mode switching when the input voltage VIN includes noise.

The power converter 220 according to example embodiments may operate in one of the first mode and the second mode based on the input voltage VIN and the reference time TDEB. For example, the power converter 220 may operate in the first mode when the input voltage VIN is greater than the first reference voltage level VL1 and may operate in the second mode when the input voltage VIN has remain less than the second reference voltage level VL2 for (or throughout) the reference time TDEB.

Referring to FIG. 7B, an operation of the power converter 220 at one or more of time point T11, a time point T12, and a time point T13 may be the as analogous to or substantially identical to an operation of a power converter at the time points T1, T2, and T3 discussed with reference to FIG. 7A.

At a time point T14, the input voltage VIN may be less than the second reference voltage level VL2 (e.g., 4.4 V). In embodiments, the power converter 220 may not perform a mode switching immediately (i.e., the power converter 220 may perform no mode switching) and may determine whether or not the input voltage VIN continues to be less than the second reference voltage level VL2.

At a time point T15 at which the reference time TDEB has elapsed since the time point T14, the power converter 220 may perform mode switching. In embodiments, the reference time TDEB may be 16 msec.

That is, the power converter 220 may perform mode switching from the first mode to the second mode because the input voltage VIN has maintained less than the second reference voltage level VL2 from the time point T14 to the time point T15. A change (e.g., an undershooting) of the output voltage (e.g., the first power voltage ELVDD) occurs due to the mode switching from the first mode to the second mode.

During the reference time TDEB (e.g., between the time point T14 and the time point T15), the power converter 220 may not perform a mode switching even if the input voltage VIN has been less than the second reference voltage level VL2.

In example embodiments, at a time point T16, an operation of the power converter 220 may be as analogous to or substantially identical to an operation of the power converter 220 at the time point T14. The input voltage VIN may increase at a time point T17, may be greater than the second reference voltage level VL2 after the time point T17, and may be greater than the second reference voltage level VL2 at a time point T18 (e.g., a time at which the reference time TDEB has elapsed since the time point T16). Because the input voltage VIN has become greater than the second reference voltage level VL2 at the time point T17 before the time point T18, the power converter 220 may not perform mode switching between time points T16 and T18.

That is, the power converter 220 may determine that a variation of the input voltage VIN at the time point T16 is a temporary phenomenon (and/or may determine that a change of the input voltage VIN occurs due to noise) and may not perform unnecessary mode switching. Therefore, unnecessary change (e.g., an undershooting) of the output voltage (e.g., the first power voltage ELVDD) may be prevented.

Figure 8:
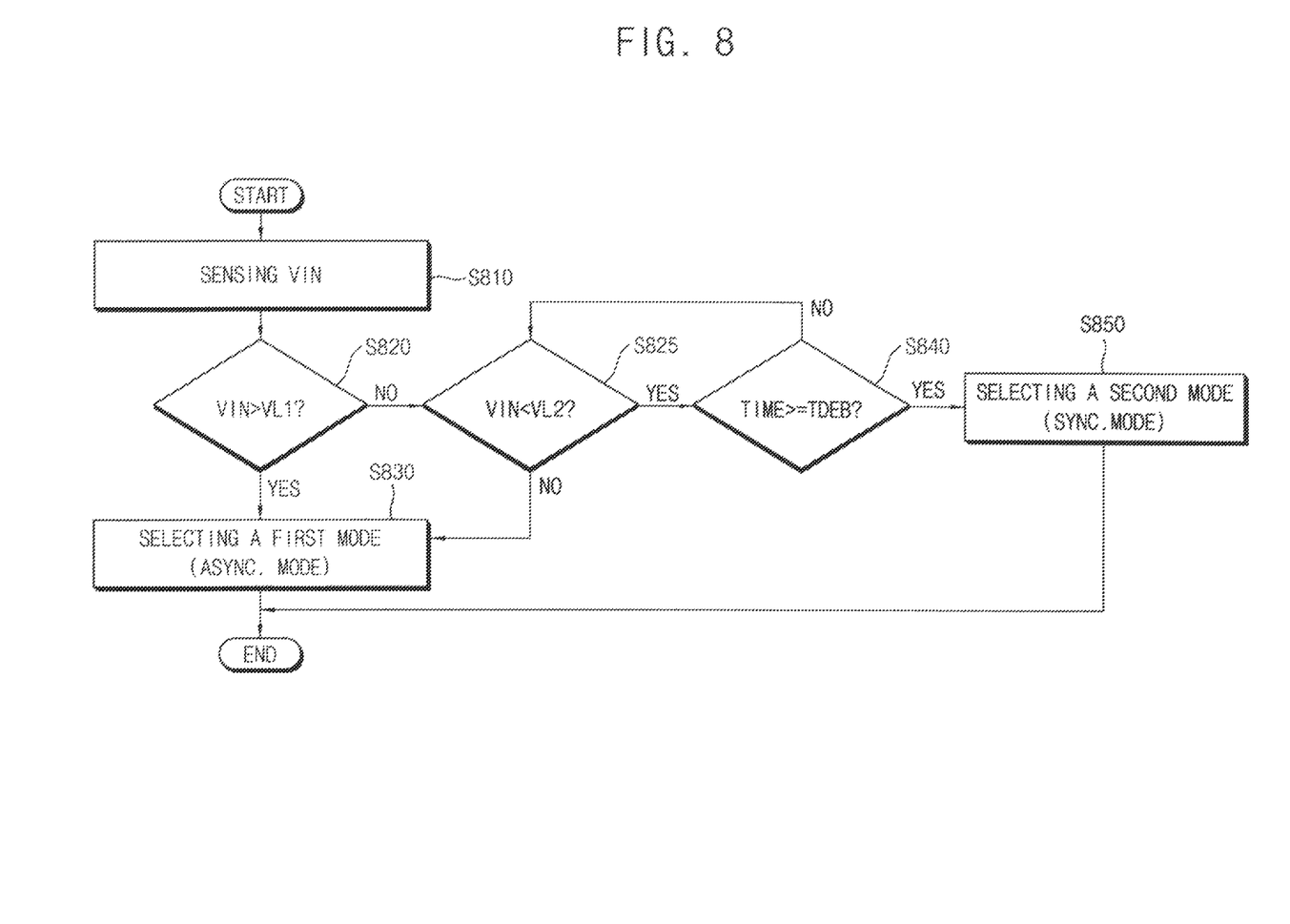
FIG. 8 is a flow diagram (e.g., a flowchart) illustrating a method of operating a power converter according to example embodiments.

FIG. 8 is a flow diagram (or flowchart) illustrating a method of operating a power converter according to example embodiments.

Referring to FIGS. 1, 2, 3, and 8, the method of FIG. 8 may be performed by one or more elements of the display device 100 illustrated in FIG. 1, such as the power controller 210 and/or the power converter 220 illustrated in FIG. 2 and FIG. 3.

The power controller 210 and/or the power converter 200 may sense the input voltage VIN received by the power converter 220 (in step S810) and may compare the input voltage VIN with the first reference voltage level VL1 (in step S820).

In the method, if the input voltage VIN is greater than the first reference voltage level VL1, the power controller 210 and/or the power converter 220 may select the first mode (in step S830), and the power converter 220 may operate in the first mode. Therefore, the power converter 220 may generate an output voltage (e.g., the first power voltage ELVDD) using the first transistor M1 and the second transistor M2.

If the input voltage VIN is not greater than the first reference voltage level VL1, the power controller 201 and/or the power converter 220 may compare the input voltage VIN with the second reference voltage level VL2 (in step S825). If the input voltage VIN is less than the second reference voltage level VL2, the power controller 210 and/or the power converter 220 may determine whether or not the input voltage VIN has maintained less than the second reference voltage level VL2 for the reference time TDEB (S840). The steps S825 and S840 may be repeated until the reference time TDEB expires.

In example embodiments, when/if the input voltage VIN is less than the second reference voltage level VL2, the power controller 210 and/or the power converter 220 may generate the second mode selection signal TA_ENT2 but may delay (or hold off) outputting of the second mode selection signal TA_ENT2 for the reference time TDEB (i.e., the power controller 210 and/or the power converter 200 may delay mode switching).

If the input voltage VIN is/becomes no less than the second reference voltage level VL2 within the reference time TDEB (i.e., before the reference time TDEB expires), the power controller 210 and/or the power converter 220 may cancel the second mode selection signal TA_ENT2, and the power converter 220 may operate in the first mode (or may maintain the first mode) (in step S830).

As described with reference to FIG. 2, when the first mode selection signal TA_ENT1 and the second mode selection signal TA_ENT1 are integrated as a mode signal (e.g., the mode selection signal TA_ENT), the first mode selection signal may have a logic high level (or may correspond to a logic high level) and the second mode selection signal may have a logic low level (or may correspond to a logic low level). If the input voltage VIN is/become not lower than the second reference voltage level VL2 within the reference time TDEB, the power controller 210 and/or the power converter 220 may change the second mode selection signal TA_ENT2 (e.g., the logic low level of the mode signal) into the first mode selection signal TA_ENT1 (e.g., the logic high level of the mode signal). Therefore, the power converter 220 may operates in the first mode (or may maintain the first mode) according to the first mode selection signal TA_ENT1 (or the mode signal having the logic high level) (in step S830).

If the input voltage VIN has maintained lower than the second reference voltage level VL2 for the reference time TDEB, the power controller 210 and/or the power converter 220 may output the second mode selection signal TA_ENT2 at an end point of the reference time TDEB and may select the second mode in response to the second mode selection signal TA_ENT2 (in step S850). In embodiments, the power converter 220 may operate in the second mode (or may perform mode switching form the first mode to the second mode).

As described with reference to FIG. 3, the second reference voltage level VL2 and the reference time TDEB may be variable and/or may be determined according to the operating condition of the power converter 220 and/or the display device 100. The second reference voltage level VL2 may be determined based on a predetermined first reference voltage level VL1 and a selected input threshold level VTH, and the input threshold level VTH may be changed according to a driving/operating condition of the display device 100 and/or the power converter 220. Therefore, the second reference voltage level VL2 may be optimized. Similarly, the reference time TDEB may be determined in accordance with the driving/operating condition of the display device 100 and/or the power converter 220.

In some example embodiments, the power controller 210 and/or the power converter 220 may select the first mode when the first mode selection signal TA_ENT1 is provided from the external component (e.g., the power controller 210). That is, the power controller 210 and/or the power converter 220 may control the power converter 220 to operate in the first mode regardless of a result of the step S820.

The power controller 210 and/or the power converter 220 may repeatedly perform the step S810 for sensing the input voltage VIN, the step 820 for comparing the input voltage VIN with the first reference voltage level VL1, the step S825 for comparing the input voltage VIN with the second reference voltage level VL2, and the step S840 to determine whether the reference time TDEB has expired, for determining whether to select the first mode in the step S830 or to select the second mode in S850.

As described above, the power controller 210 and/or the power converter 200 may control the power converter 220 to operate in the first mode (e.g., an asynchronous mode) if the input voltage VIN is greater than the first reference voltage level VL1 and to operate in the second mode (e.g., a synchronous mode) if the input voltage VIN has maintained less than the second reference voltage level VL2 for the reference time TDEB. Therefore, the method of FIG. 8 may prevent unnecessary mode switching potentially caused by noise of the input voltage VIN (e.g., a sudden/transient change of the input voltage VIN). In embodiments, the method of FIG. 8 may minimize impact of noise on the output voltage by adjusting and/or selecting one or more values of the second reference voltage level VL2, the input threshold level VTH, and/or the reference time TDEB.

Embodiments may be applied to a display device (e.g., one of an organic light emitting display device, a liquid crystal display device, etc.). Embodiments may be applied to one or more of a television, a computer monitor, a laptop, a digital camera, a cellular phone, a smart phone, a personal digital assistant (PDA), a portable multimedia player (PMP), an MP3 player, a navigation system, a video phone, etc.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. All such modifications are intended to be included within the scope defined in the claims.

What is claimed is:

1. A power converter comprising:
an input terminal for receiving an input voltage;
an output terminal for providing an output voltage;
a reference member for receiving a reference voltage;
a first transistor electrically connected between the reference member and the input terminal;
a second transistor electrically connected between the input terminal and the output terminal;
a diode electrically connected in parallel with the second transistor; and
a controller configured to select a first mode in response to that the input voltage is greater than a first reference voltage level and to select a second mode-if in response to that the input voltage has been less than a second reference voltage level for a reference time period,
wherein the first transistor and the diode are configured to generate the output voltage in the first mode, and
wherein the first transistor and the second transistor are configured to generate the output voltage in the second mode,
wherein the controller includes:
a comparator configured to compare the input voltage with at least one of the first reference voltage level and the second reference voltage level, and
wherein the controller is configured to select one of the first mode and the second mode based on a comparison result of the comparator and based on whether the reference time period has expired.

2. The power converter of claim 1, wherein the controller controls the first transistor and the second transistor to be alternately turned on in the second mode.

3. The power converter of claim 1, wherein the controller controls the second transistor to remain turned off in the first mode.

4. The power converter of claim 1, wherein the controller is configured to generate a first control signal for the first transistor and a second control signal for the second transistor based on a selected one of the first mode and the second mode.

5. The power converter of claim 1, wherein the controller is configured to set the first reference voltage level, the second reference voltage level, and the reference time period.

6. The power converter of claim 5, wherein the controller sets the second reference voltage level based on the first reference voltage level and an input threshold voltage.

7. The power converter of claim 6, wherein the second reference voltage level is lower than the first reference voltage level by the input threshold voltage.

8. The power converter of claim 5, wherein the determiner selects a first reference time lengths among reference time lengths to be the reference time period.

9. The power converter of claim 1 comprising: a control component electrically connected to the controller and configured to provide a mode selection signal, wherein the controller receives the mode selection signal from the control component and selects one of the first mode and the second mode based on the mode selection signal.

10. A display device comprising:
a display panel; and
a power converter configured to generate an output voltage using an input voltage and to provide the output voltage to the display panel,
wherein the power converter includes:
an input terminal for receiving the input voltage;
an output terminal for providing the output voltage;
a reference member for receiving a reference voltage;
a first transistor electrically connected between the reference member and the input terminal;
a second transistor electrically connected between the input terminal and the output terminal;
a diode electrically connected in parallel with the second transistor; and
a controller configured to select a first mode in response to that the input voltage is greater than a first reference voltage level and to select a second mode in response to that the input voltage has been less than a second reference voltage level for a reference time period,
wherein the power converter is configured to generate the output voltage using the first transistor and the diode in the first mode and is configured to generate the output voltage using the first transistor and the second transistor in the second mode,
wherein the controller includes:
a comparator configured to compare the input voltage with at least one of the first reference voltage level and the second reference voltage level, and
wherein the controller is configured to select one of the first mode and the second mode based on a comparison result of the comparator and based on whether the reference time period has expired.

11. The display device of claim 10, further comprising:
a power controller configured to convert an external voltage into a first direct current voltage, to provide the power converter with one of the first direct current voltage and a second direct current voltage received from a battery component, and to generate a first mode selection signal in response to that the first direct current voltage is selected to be provided to the power converter,
wherein the power converter is configured to selects the first mode based on the first mode selection signal.

12. A method of operating a power converter, the method comprising:
receiving an input voltage using an input terminal of the power converter;
receiving a reference voltage using a reference member of the power converter;
outputting an output voltage using an output terminal of the power converter;
comparing the input voltage with a first reference voltage level and with a second reference voltage level, the second reference voltage level being lower than the first reference voltage level;
in response to that the input voltage is higher than the first reference voltage level, selecting a first mode to use a first transistor of the power converter and a diode of the power converter to generate the output voltage, wherein the first transistor is electrically connected between the reference member and the input terminal, and wherein the diode is electrically connected between the input terminal and the output terminal;
in response to that the input voltage has been lower than the second reference voltage level for a reference time period, selecting a second mode to use the first transistor and a second transistor of the power converter to generate the output voltage, wherein the second transistor is electrically connected between the input terminal and the output terminal in parallel with the diode;
determining an input threshold voltage; and determining the second reference voltage level such that the second reference voltage level is equal to the first reference voltage level minus the input threshold voltage.

13. The method of claim 12 comprising:
generating a mode selection signal in response to a condition that the input voltage is lower than the second reference voltage level; and
delaying outputting of the mode selection signal until expiration of the reference time period.

14. The method of claim 12 comprising:
generating a first mode selection signal within the reference time period; and
canceling a second mode selection signal in response to generation of the first mode selection signal, wherein the second mode selection signal has been generated responsive to a condition that the input voltage is lower than the second reference voltage level.

15. The method of claim 12 comprising:
generating a mode selection signal responsive to a condition that the input voltage is lower than the second reference voltage level; and
selecting the second mode in response to the second mode selection signal when the reference time period has expired.

16. The method of claim 12 comprising:
determining a first input threshold voltage according to a first operating condition;
determining a first value of the second reference voltage level using the first reference voltage level and the first input threshold voltage;
determining a second input threshold voltage according to a second operating condition; and
determining a second value of the second reference voltage level using the first reference voltage level and the second input threshold voltage.

17. The method of claim 12 comprising:
determining a first length for the reference time period according to a first operating condition;
using the first length for the reference time period in a first operation of the power converter;
determining a second length for the reference time period according to a second operating condition; and
using the second length for the reference time period in a second operation of the power converter.

18. The method of claim 12 comprising:
in response to that the input voltage is less than the first reference voltage level, repeatedly comparing the input voltage with the second reference voltage level before expiration of the reference time period.

* * * * *